US010795473B2

(12) United States Patent
Hur et al.

(10) Patent No.: US 10,795,473 B2
(45) Date of Patent: Oct. 6, 2020

(54) DISPLAY DEVICE INCLUDING TOUCH SENSOR

(71) Applicant: LG Display Co., Ltd., Seoul (KR)

(72) Inventors: Juno Hur, Paju-si (KR); Soondong Cho, Paju-si (KR); Hoon Jang, Paju-si (KR); Dongju Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 186 days.

(21) Appl. No.: 16/155,632

(22) Filed: Oct. 9, 2018

(65) Prior Publication Data

US 2019/0204968 A1 Jul. 4, 2019

(30) Foreign Application Priority Data

Dec. 29, 2017 (KR) ........................ 10-2017-0184778

(51) Int. Cl.

| | |
|---|---|
| ***G06F 3/041*** | (2006.01) |
| ***G06F 3/044*** | (2006.01) |
| ***G09G 3/36*** | (2006.01) |

(52) U.S. Cl.

CPC ............ *G06F 3/0412* (2013.01); *G06F 3/044* (2013.01); *G06F 3/0416* (2013.01); *G09G 3/3648* (2013.01); *G09G 3/3677* (2013.01); *G09G 3/3688* (2013.01); *G09G 3/3655* (2013.01); *G09G 2300/0814* (2013.01); *G09G 2310/0286* (2013.01); *G09G 2354/00* (2013.01)

(58) Field of Classification Search

CPC .................................................... G09G 3/3655

See application file for complete search history.

(56) References Cited

U.S. PATENT DOCUMENTS

| | | | |
|---|---|---|---|
| 9,335,852 | B2 | 5/2016 | Lee et al. |
| 9,459,717 | B2 | 10/2016 | Lee et al. |
| 10,073,562 | B2 | 9/2018 | Mo et al. |
| 2014/0368485 | A1 | 12/2014 | Liu et al. |
| 2016/0004371 | A1 | 1/2016 | Kim et al. |
| 2016/0018916 | A1 | 1/2016 | Lee et al. |
| 2016/0019827 | A1 | 1/2016 | Lee et al. |
| 2016/0334934 | A1 | 11/2016 | Mo et al. |
| 2017/0090630 | A1 | 3/2017 | Kim et al. |
| 2017/0242529 | A1 | 8/2017 | Park et al. |
| 2018/0341365 | A1 | 11/2018 | Mo et al. |

FOREIGN PATENT DOCUMENTS

| | | | |
|---|---|---|---|
| EP | 3051531 | A1 | 8/2016 |
| EP | 3156885 | A1 | 4/2017 |
| JP | 2016212897 | A | 12/2016 |
| JP | 2017507436 | A | 3/2017 |
| KR | 10-2017-0079392 | | 7/2017 |

OTHER PUBLICATIONS

Office Action, Japanese Patent Application No. 2018-202581, dated Nov. 28, 2019, 10 pages.

Extended European Search Report, European Patent Application No. 18201366.4, dated Apr. 23, 2019, 8 pages.

*Primary Examiner* — Gustavo Polo

(74) *Attorney, Agent, or Firm* — Fenwick & West LLP

(57) ABSTRACT

Provided is a display device including a level shifter generating an output clock swinging between a first voltage and a third voltage during a display period and swinging between a second voltage and the third voltage during a touch sensing period. Waveform distortion of a no-load alternating current (AC) signal may be prevented without eliminating a stabilizing capacitor of the level shifter, and thus, sensing sensitivity may be increased by reducing noise of a touch sensor signal.

24 Claims, 10 Drawing Sheets

DISPLAY DEVICE INCLUDING TOUCH SENSOR

CROSS-REFERENCE TO RELATED APPLICATIONS

This application claims priority from Republic of Korea Patent Application No. 10-2017-0184778 filed on Dec. 19, 2017, which is hereby incorporated by reference in its entirety.

BACKGROUND

Field of Technology

The present disclosure relates a display device having a touch sensor, and more particularly to a display device in which a no-load alternating current (AC) signal synchronized with a touch sensor driving signal is supplied to gate lines.

Related Art

User interfaces (UIs) enable communication between people (users) and various electric or electronic devices, allowing the users to easily control the devices as desired. Typical examples of the user interfaces include a keypad, a keyboard, a mouse, an on-screen display (OSD), and a remote controller having infrared communication or radio frequency (RF) communication functions. UI technologies have advanced toward enhancing user sensibility and ease of operation. Recently, UIs have been developed as a touch UI, a voice recognition UI, a 3D UI, and the like.

The touch UI realizes a touch screen on a display panel to sense a touch input and transmit a user input to an electronic device. The touch UI has essentially been adopted in portable information devices such as smartphones, and extendedly applied to notebook computers, computer monitors, home appliances, and the like.

A technique of realizing a touch screen is applied to various display devices using a technique of incorporating touch sensors in a pixel array of a display panel. The touch sensors may be realized as capacitive touch sensors which sense a touch on the basis of a change in capacitance before and after the touch.

Since the touch sensors are embedded in the pixel array of the display panel, the touch sensors are coupled to pixels through parasitic capacitance. In order to reduce mutual influences due to coupling between the pixels and the touch sensors, an in-cell touch sensor technique divides one frame period into a display period and a touch sensing period to time-divide a driving time of the pixels and a driving time of the touch sensors.

A driver of a display device includes a data driver supplying a data signal of an input image to data lines of a display panel during a display period, a gate driver (or scan driver) supplying gate pulses (or scan pulses) synchronized with the data signal during the display period, and a touch sensor driver driving the touch sensors during a touch sensing period.

SUMMARY

When the pixels of the display panel are connected to the touch sensors, noise of the touch sensor signal may be increased due to capacitor coupling that occurs through parasitic capacitance between the touch sensors and lines of the pixel array. In order to reduce the parasitic capacitance between the touch sensors and the lines of the pixel array, a load-free driving signal having the same phase as that of the touch sensor driving signal may be applied to the lines of the pixel array.

The load-free driving signal applied to the gate lines may be generated by a method of converting a gate-low voltage (VGL) input to a level shifter into an AC signal. With this method, however, a waveform of the load-free driving signal may be distorted due to a stabilizing capacitor connected to the VGL line connected to the level shifter. If the waveform of the load-free driving signal is distorted, noise of the touch sensor signal is increased to degrade performance of the touch sensor. Meanwhile, if the stabilizing capacitor of the VGL line is removed, noise of the gate low voltage (VGL) may increase to cause the level shifter to malfunction.

The present disclosure provides a display device capable of preventing waveform distortion of a load-free driving signal without removing a stabilizing capacitor of a level shifter.

In one embodiment, a display device comprises: a display panel including a plurality of data lines and a plurality of gate lines intersecting the plurality of data lines, a plurality of pixels arranged in a matrix form, and a plurality of touch sensors connected to the plurality of pixels; a power supply unit generating a first voltage, a second voltage that is less than the first voltage, and a third voltage that is less than the first voltage and greater than the second voltage; a control signal generating unit generating a synchronization signal defining a display period during which the display panel displays an image and a touch sensing period during which touch of the display panel is sensed, and an input clock defining a gate pulse period during the display period and defining a pulse period of an alternating current (AC) signal during the touch sensing period; a level shifter receiving the synchronization signal, the input clock, the first voltage, the second voltage, and the third voltage and generating an output clock swinging between the first voltage and the second voltage during the display period, the output clock swinging between the second voltage and the third voltage during the touch sensing period; and a gate driver supplying a gate pulse swinging between the first voltage and the second voltage to the plurality of gate lines during the display period and supplying the AC signal swinging between the third voltage and the second voltage to the plurality of gate lines during the touch sensing period.

In one embodiment, a display device comprises: a display panel including a plurality of data lines and a plurality of gate lines intersecting the plurality of data lines, a plurality of pixels arranged in a matrix form, and a plurality of touch sensors connected to the plurality of pixels; a power supply unit generating a first voltage, a second voltage that is less than the first voltage, and a third voltage that is less than the first voltage and greater than the second voltage; a control signal generating unit generating a synchronization signal defining a display period during which the display panel display an image and a touch sensing period during which touch of the display panel is sensed, an input clock defining a gate pulse period during the display period and defining a pulse period of an alternating current (AC) signal during the touch sensing period, and a pulse width modulation (PWM) signal defining a pulse period of the AC signal during the touch sensing period; a level shifter receiving the synchronization signal, the input clock, the first voltage, the second voltage, and the third voltage and generating an output clock swinging between the first voltage and the second voltage during the display period and the output clock swinging between the second voltage and the third voltage during the touch sensing period; and a gate driver supplying a gate pulse swinging between the first voltage and the second voltage to the plurality of gate lines during the display period and supplying the AC signal swinging between the third voltage and the second voltage to the plurality of gate lines during the touch sensing period.

In one embodiment, a display device comprises: a display panel including a plurality of data lines and a plurality of gate lines intersecting the plurality of data lines, a plurality of pixels arranged in a matrix form, and a plurality of touch sensors connected to the a plurality of pixels; a data driver supplying a data voltage of an input image to the a plurality of data lines during a display period during which the display panel displays the input image; a touch sensor driver supplying a common voltage to the plurality of pixels through the plurality of touch sensors during the display period and supplying a touch sensor driving signal to the plurality of touch sensors during a touch sensing period during which touch of the display panel is sensed; a gate driver supplying a gate pulse synchronized with the data voltage to the plurality of gate lines during the display period using a shift register and supplying a load-free driving signal having a same phase as the touch sensor driving signal to the plurality of gate lines during the touch sensing period; a timing controller generating a synchronization signal defining the display period and the touch sensing period and an input clock defining a gate pulse period during the display period and defining a pulse period of the load-free driving signal within the touch sensing period; a power supply unit generating a first voltage, a second voltage that is less than the first voltage, and a third voltage that is less than the first voltage and greater than the second voltage; and a level shifter receiving the synchronization signal, the input clock, the first voltage, the second voltage, and the third voltage to output a shift clock input to a shift register of the gate driver, wherein the shift clock has a waveform that matches a waveform of the gate pulse and a waveform of the load-free driving signal, the gate pulse swings between the first voltage and the third voltage during the touch sensing period, and the load-free driving signal swings between the second voltage and the third voltage during the touch sensing period.

In one embodiment, a display device comprises: a display panel including a plurality of data lines and a plurality of gate lines intersecting the a plurality of data lines, a plurality of pixels arranged in a matrix form, and a plurality of touch sensors connected to the a plurality of pixels; a data driver supplying a data voltage of an input image to the a plurality of data lines during a display period during which the display panel displays the input image; a touch sensor driver supplying a common voltage to the plurality of pixels through the plurality of touch sensors during the display period and supplying a touch sensor driving signal to the plurality of touch sensors during a touch sensing period during which touch of the display panel is sensed; a gate driver supplying a gate pulse synchronized with the data voltage to the plurality of gate lines during the display period and supplying a load-free driving signal having a same phase as the touch sensor driving signal to the plurality of gate lines during the touch sensing period; a timing controller generating a synchronization signal defining the display period and the touch sensing period, an input clock defining a gate pulse period during the display period and defining a pulse period of the load-free driving signal within the touch sensing period, and a pulse width modulation (PWM) signal defining a pulse period of the load-free driving signal within the touch sensing period; a power supply unit generating a first voltage, a second voltage that is less than the first voltage, and a third voltage that is less than the first voltage and greater than the second voltage; and a level shifter receiving the synchronization signal, the input clock, the PWM signal, the first voltage, the second voltage, and the third voltage to output a shift clock input to a shift register of the gate driver, wherein the shift clock includes has a waveform that matches a waveform of the gate pulse and a waveform of the load-free driving signal, the gate pulse swings between the first voltage and the third voltage during the touch sensing period, and the load-free driving signal swings between the second voltage and the third voltage during the touch sensing period.

In one embodiment, a display device comprises: a display panel including a plurality of data lines and a plurality of gate lines interesting the plurality of data lines, a plurality of pixels at the intersections of the plurality of gate lines and the plurality of data lines, and a plurality of touch sensors connected to the plurality of pixels; a level shifter configured to generate an output clock that swings between a first voltage and a second voltage that is greater than the first voltage during a display period during which the display panel displays an image, and configured to generate the output clock that swings between the first voltage and a third voltage that is less than the second voltage and greater than the first voltage during a touch sensing period during which touch of the display panel is sensed; and a gate driver configured to supply a gate pulse to the plurality of gate lines, the gate pulse swinging between the first voltage and the second voltage during the display period, and the gate pulse swinging between the first voltage and the third voltage during the touch sensing period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
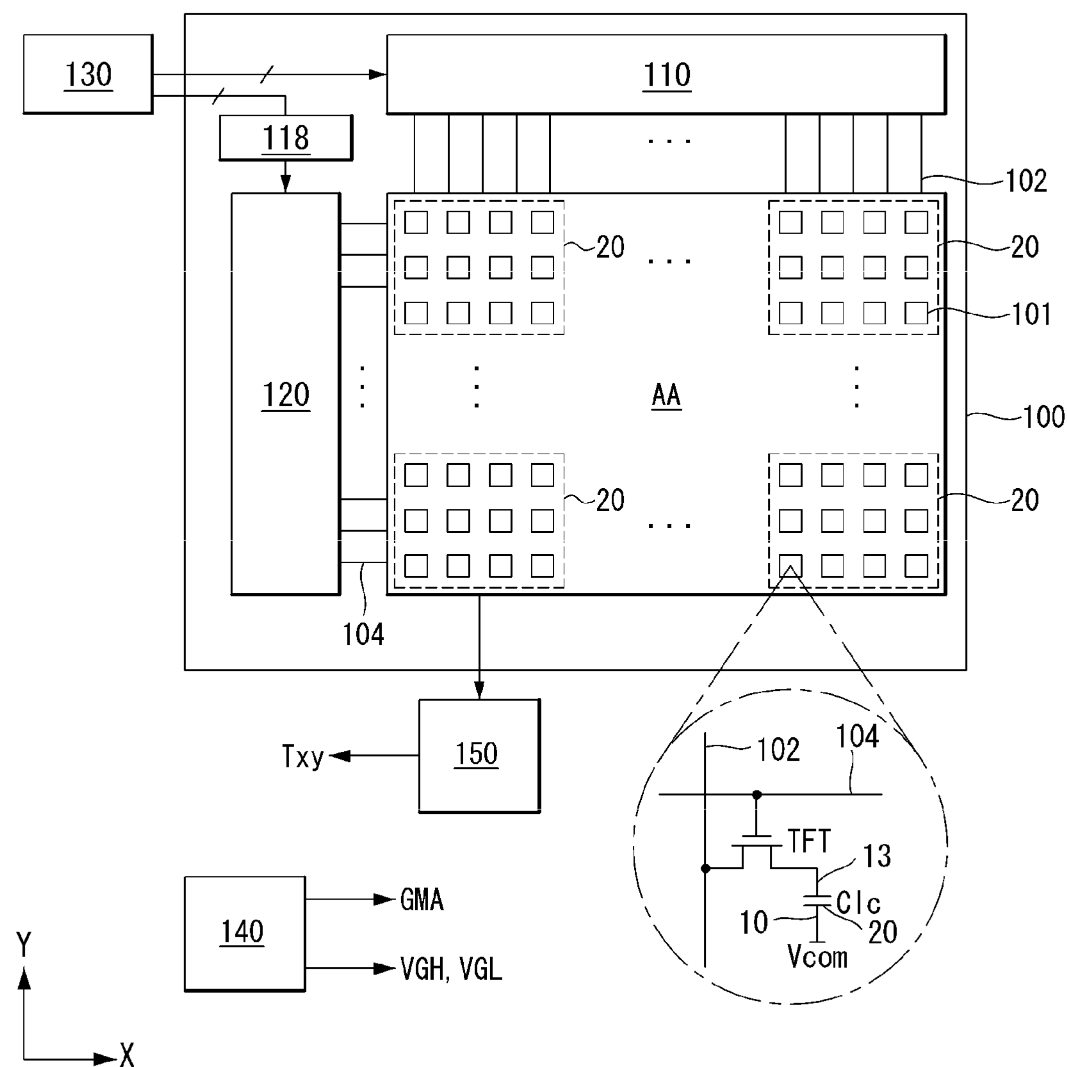
FIG. 1 is a schematic view illustrating a display device according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when two portions are described as "~on", "~above", "~below", or "~on the side", one or more other components may be positioned between the two components unless "immediately" or "directly" is used.

It will be understood that, although the terms "first", "second", etc. may be used herein to distinguish between various elements, these elements should not be limited by the ordinal number of the components or the name of the components in function or structure.

The following embodiments of the present disclosure may be partially or overall coupled to or combined with each other, and may be variously inter-operated with each other and driven technically as those skilled in the art may sufficiently understand. The embodiments of the present disclosure may be carried out independently from each other, or may be carried out together in co-dependent relationship.

A display device of the present disclosure may be realized as a flat panel display device such as a liquid crystal display (LCD), an organic light emitting display, or the like. In the following embodiments, an LCD device will be described as an example of the flat panel display device, but the present disclosure is not limited thereto. For example, the present disclosure may also be applied to a display device in which touch sensors are embedded as an in-cell type in a pixel array of a display panel.

The pixel array, a level shifter, and a gate driver of the display device of the present disclosure may include a plurality of transistors. Each transistor may be realized as a thin film transistor (TFT) having substantially the same structure as a transistor formed in the pixel array. The transistors may be realized as one or more of a low temperature polysilicon (LTPS) TFT, an oxide TFT, and an a-Si TFT. A transistor is a three-electrode device including a gate, a source, and a drain. The source is an electrode supplying a carrier to the transistor. Within the transistor, the carrier starts to flow from the source. The drain is an electrode from which the carrier exits the transistor. In the transistor, the carrier flows from the source to the drain. In the case of an n-channel transistor (NMOS), since the carrier is an electron, a source voltage is lower than a drain voltage so that electrons may flow from the source to the drain. As for a direction of the current in the n-channel transistor (NMOS), current flows from the drain to the source. In the case of a p-channel transistor (PMOS), since the carrier is a hole, the source voltage is higher than the drain voltage so that holes may flow from the source to the drain. Since the holes flow from the source to the drain in the p-channel transistor (PMOS), current flows from the source to the drain. It should be noted that the source and drain of the transistor are not fixed. For example, the source and the drain may be changed according to an applied voltage. Therefore, the present disclosure is not limited by the source and the drain of the transistor. In the following description, the source and the drain of the transistor will be referred to as first and second electrodes.

A gate signal of the transistor swings between a gate-on voltage and a gate-off voltage. The gate-on voltage is set to a voltage at which the transistor is turned on, and the gate-off voltage is set to a voltage at which the transistor is turned off. In the case of an re-channel transistor NMOS, the gate-on voltage may be a gate high voltage VGH and the gate-off voltage may be a gate low voltage VGL lower than the gate high voltage VGH. In the case of a p-channel transistor PMOS, the gate-on voltage may be a gate low voltage VGL and the gate-off voltage may be a gate high voltage VGH.

Hereinafter, various embodiments of the present disclosure will be described in detail with reference to the accompanying drawings.

Figure 2:
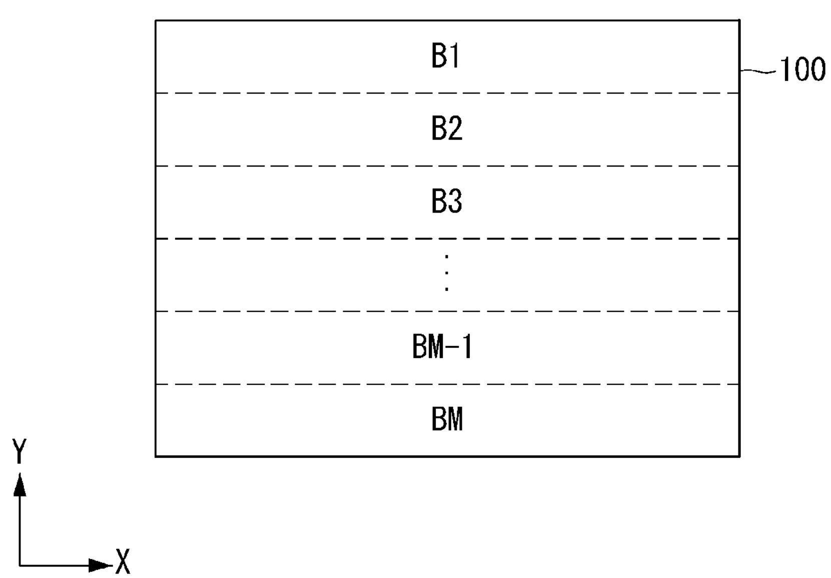
FIG. 2 is a view illustrating an example in which a screen of a display device is divided into a plurality of blocks and driven according to an embodiment of the present disclosure.
Figure 3:
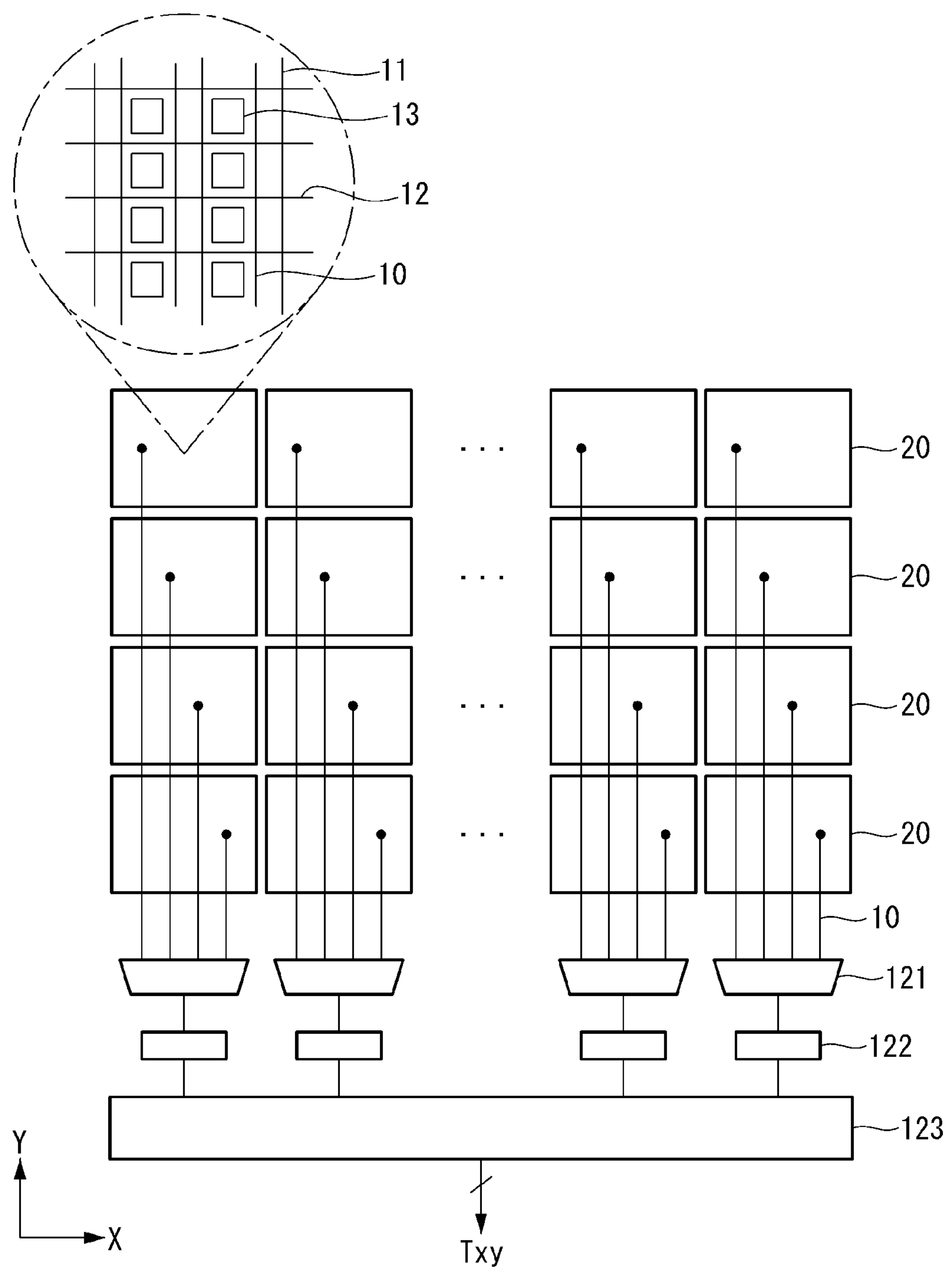
FIG. 3 is a view illustrating a touch sensor driver, a sensor line, and a touch sensor electrode according to an embodiment of the present disclosure.

FIG. 1 is a view schematically illustrating a display device according to an embodiment of the present disclosure. FIG. 2 is a view illustrating an example in which a screen of a display device is dividedly driven by a plurality of blocks. FIG. 3 is a view illustrating a touch sensor driver, a sensor line, and a touch sensor electrode.

Referring to FIGS. 1 to 3, the display device according to the present disclosure includes a display panel 100, a power supply unit 140, a data driver 110, a gate driver 120, a level shifter 118, a touch sensor driver 150, a timing controller 130, and the like.

The screen of the display panel 100 includes data lines 102, gate lines 104 intersecting the data lines 102, and a pixel array AA in which pixels 101 are disposed in a matrix form defined by the data lines 102 and the gate lines 104. The screen of the display panel 100 further includes touch sensors and sensor lines 10 connected to the touch sensors. A polarizing film may be adhered to each of an upper plate and a lower plate of the display panel 100. A back light unit (BLU) may be positioned below the display panel 100.

The pixel array AA of the display panel 100 may be divided into a TFT array and a color filter array. The TFT array may be formed on the upper plate or the lower plate of the display panel 100. The TFT array includes TFTs formed at intersections of the data lines 102 and the gate lines 104, a sensor line 10 connected to the touch sensors, a pixel electrode 13 of a liquid crystal cell Clc charging a voltage of a data signal, a touch sensor electrode 20 to which a common voltage Vcom and a touch sensor driving signal are supplied, a storage capacitor Cst connected to the pixel electrode 13 to hold a data signal, and the like, and display an input image. The storage capacitor is omitted in the drawing.

The TFT formed in the pixel is turned on according to the gate high voltage VGH of the gate pulse to supply a data signal on the data line 102 to the pixel electrode 13. During a display period in which the data signal of the input image is written to the pixel, liquid crystal molecules of the liquid crystal cell Clc are driven according to a voltage difference between the data signal applied to the pixel electrode 13 and the common voltage Vcom applied to the touch sensor electrode 20 to delay a phase of light incident to the display panel.

The color filter array may be formed on the upper plate or the lower plate of the display panel 100. The color filter array includes a black matrix, a color filter, and the like. In the case of a color filter on TFT (COT) or a TFT on color filter (TOC) model, a color filter and a black matrix together with a TFT array may be arranged on one substrate.

The touch sensors installed on the display panel 100 may be realized as capacitive type touch sensors such as a mutual capacitance sensor or a self-capacitance sensor. Self-capacitance is formed along a conductor line of a single layer formed in one direction. The mutual capacitance is formed between two orthogonal conductor lines. FIG. 3 illustrates a self-capacitance type touch sensor, but the touch sensors of the present disclosure are not limited thereto.

Figure 4:
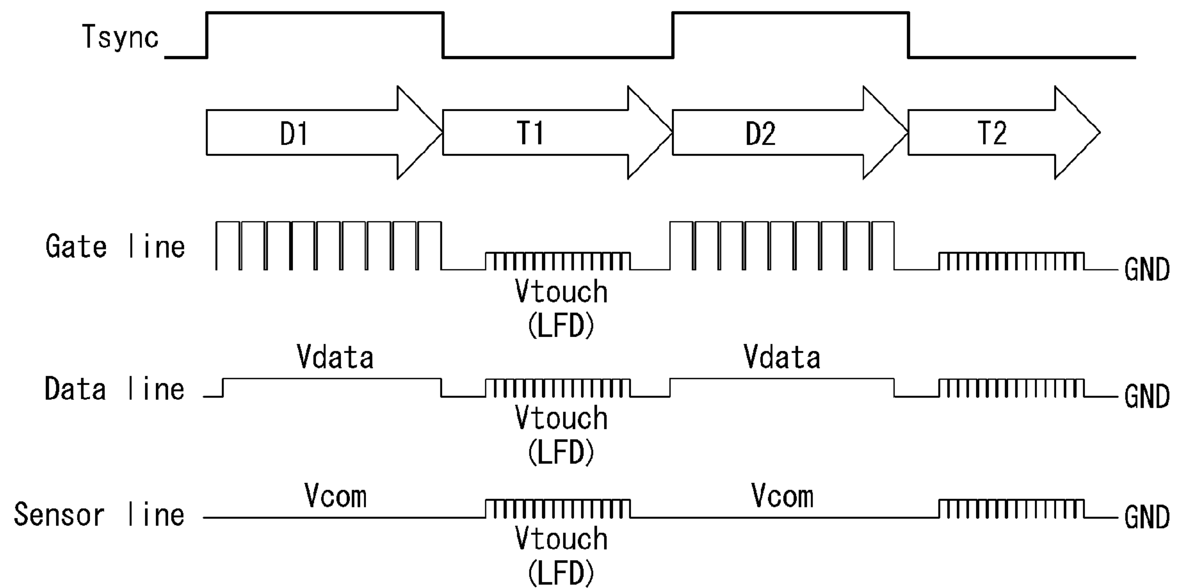
FIGS. 4 and 5 are waveform views illustrating a method of driving pixels and touch sensors of a display panel according to an embodiment of the present disclosure.
Figure 5:
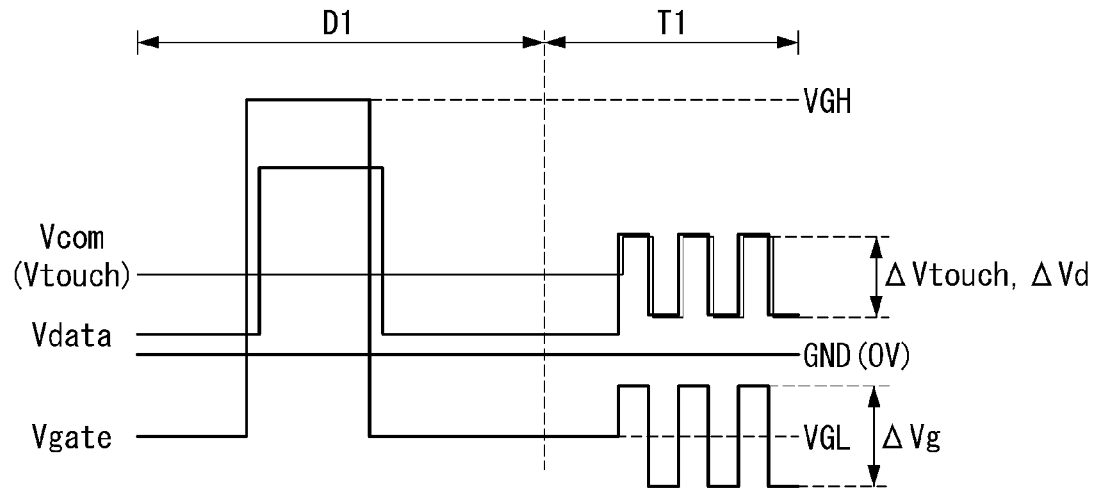

The touch sensors are electrically connected to the pixels through the sensor lines 10. Each of the touch sensor electrodes 20 of each of the touch sensors may be connected to the plurality of pixels as illustrated in FIGS. 1 and 3. As illustrated in FIGS. 4 and 5, the touch sensor electrodes 20 are connected to the plurality of pixels to supply the common voltage Vcom to the plurality of pixels during the display period.

One frame period of the display panel 100 is time-divided into one or more display periods and one or more touch sensing periods in order to drive the touch sensors and pixels embedded in the pixel array AA. The pixel array AA of the display panel 100 may be driven in a time division manner by two or more blocks B1 to BM as illustrated in FIG. 2. The pixel array AA of the display panel 100 is dividedly driven into display periods separated with a touch sensing period in which the touch sensors are driven interposed therebetween. The blocks B1 to BM need not be physically divided in the display panel 100.

The blocks B1 to BM are driven in a time division manner with the touch sensing period interposed therebetween. For example, in FIG. 4, pixels of a first block B1 are driven during the first display period D1 to write current frame data into the pixels, and thereafter, during a first touch sensing period T1, a touch input is sensed in the entire screen. Following the first touch sensing period T1, pixels of the second block B2 are driven during the second display period D2 to write the current frame data into the pixels. Thereafter, a touch input is sensed in the entire screen during the second touch sensing period T2. Here, the touch input may include a direct touch input of a finger or a stylus pen, a proximity touch input, a fingerprint touch input, and the like.

Such a driving method of the touch sensor may make a touch report rate faster than a frame rate of the screen. The frame rate is a frequency at which frame data is updated on the screen. In the National Television Standards Committee (NTSC) scheme, the frame rate is 60 Hz. In the Phase-Alternating Line (PAL) method, the frame rate is 50 Hz. The touch report rate is a frequency at which touch input coordinates are generated. According to the present disclosure, the screen is divided and driven in units of preset blocks, and a touch sensor is driven between display periods to generate coordinates, thus making the touch report rate to be faster by two times than the frame rate of the screen to increase touch sensitivity.

The power supply unit 140 may include a charge pump, a regulator, a buck converter, a boost converter, and the like. Upon receiving main power from a host system, the power supply unit 140 generates power required for driving the timing controller 130, the data driver 110, the gate driver 120, the touch sensor driver 150, and the display panel 100. The power supply unit 140 may output a gamma reference voltage GMA, a gate high voltage VGH, and a gate low voltage VGL, and the like. The gamma reference voltage is divided by a dividing circuit and converted into a gamma compensation voltage corresponding to a gray voltage of pixel data and supplied to the data driver 110.

The data driver 110 receives pixel data of an input image received from the timing controller 130 during the display period. The data driver 110 latches the pixel data of the input image and supplies the latched pixel data to a digital-to-analog converter (DAC). The DAC of the data driver 110 converts the pixel data into a gamma compensation voltage and outputs a data voltage Vdata. The data voltage Vdata is output to the data lines 102 through an output buffer. The data voltage Vdata is supplied to the pixel electrode 13 through the data lines 102 and the TFT.

The gate driver 120 includes a shift register that outputs a gate pulse synchronized with a data signal under the control of the timing controller 130. The shift register receives a start pulse and a shift clock (GCLK in FIG. 7) input through the level shifter 118, outputs a gate pulse Vgate as illustrated in FIG. 5, and shifts a gate pulse Vgate in synchronization with a shift clock timing. The shift register may be formed directly on the substrate of the display panel 100 together with the TFT array of the pixel array AA. As illustrated in FIG. 5, the gate pulse Vgate swings between the gate high voltage VGH and the gate low voltage VGL.

The touch sensor driver 150 supplies the common voltage Vcom, which is a reference potential of the pixels, to the touch sensor electrodes 20 through the sensor lines 10 to the sensor lines 10 during the display period. The touch sensor driver 150 supplies a touch sensor driving signal to the sensor lines 10 during a touch sensing period to supply electric charges to the touch sensors. The touch sensor driver 150 determines a touch input by measuring a change in capacitance of the touch sensor before and after the touch input at each of the touch sensors during the touch sensing period. The touch sensor driver 150 transmits coordinate information Txy including position information of each touch input and identification information to the host system. The identification information is information for distinguishing between each touch input from the multi-touch input.

The timing controller 130 transmits pixel data of the input image received from the host system to the data driver 110. The timing controller 130 also serves as a control signal generator generating a signal for controlling an operation timing of the data driver 110 and the gate driver 120 using a timing signal received in synchronization with the pixel data. The timing controller 130 generates a synchronization signal Tsync which defines a display period and a touch sensing period. As illustrated in FIG. 4, a first logic period of the synchronization signal Tsync may define display periods D1 and D2, and a second logic period may define the touch sensing periods T1 and T2. The first logic period may be a high logic value and the second logic section may be a low logic value, but the present disclosure is not limited thereto.

A gate timing control signal output from the timing controller 130 is converted in voltage level through the level shifter 118 and input to the shift register. The gate timing control signal includes a start pulse, a gate shift clock TGCLK, and the like. The input shift clock TGCLK generated by the timing controller 130 is a shift clock of the level shifter 118. The start pulse controls a first output timing as an input signal of the shift register. The input shift clock TGCLK controls an output shift timing of the shift register.

Figure 6:
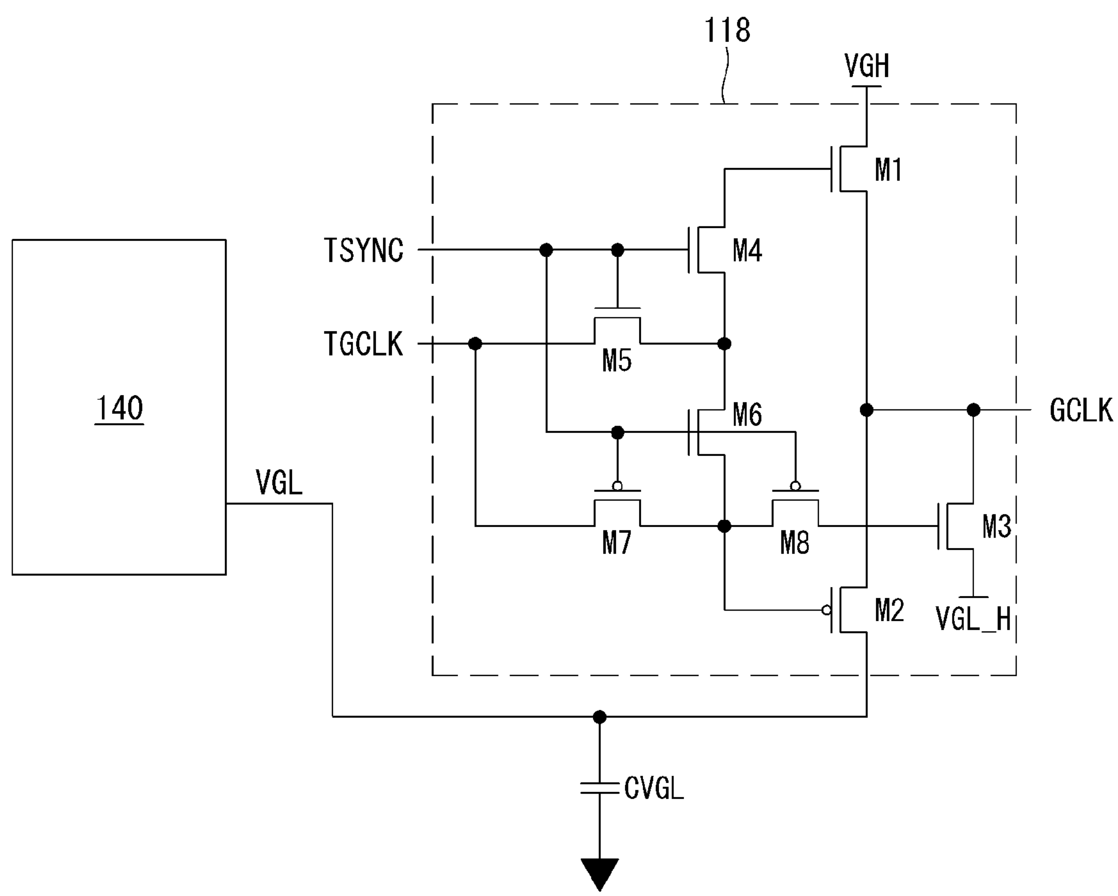
FIG. 6 is a specific circuit diagram of a level shifter according to a first embodiment of the present disclosure.
Figure 7:
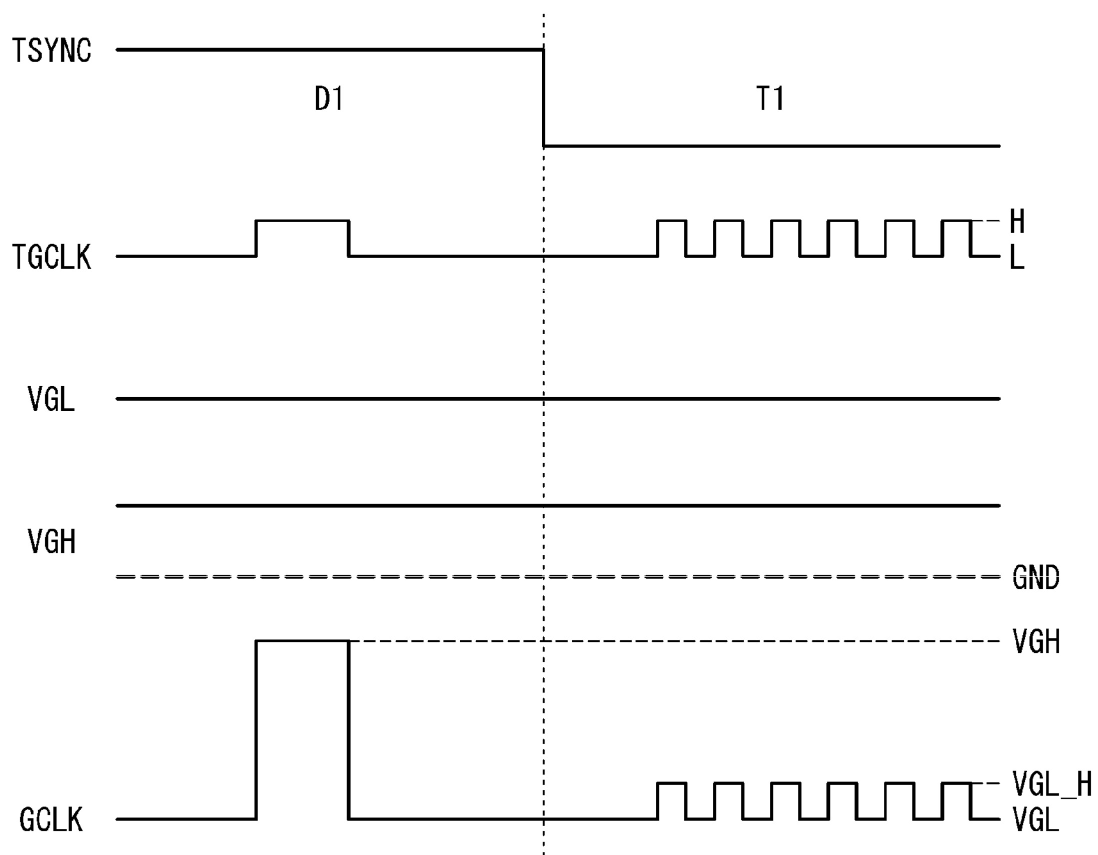
FIG. 7 is a waveform view illustrating an input/output signal of the level shifter illustrated in FIG. 6.

The level shifter 118 shifts a swing width of the gate timing control signal received from the timing controller 130 to the gate high voltage VGH and the gate low voltage VGL and supplies the same to the shift register of the gate driver 120. As illustrated in FIGS. 6 and 7, the level shifter 118 converts the gate low voltage VGL supplied from the power supply unit 140 into an AC voltage to generate a load-free driving signal LFD to be applied to the gate lines 104.

The host system may be any one of a television system, a set-top box, a navigation system, a personal computer (PC), a home theater system, a mobile device, and a wearable device. In the case of the mobile device or the wearable device, the data driver 110, the timing controller 130, the power supply unit 140, and the touch sensor driver 150 may be integrated in a single drive integrated circuit (IC).

The host system converts digital video data of the input image into a format suitable for display on the display panel 100. The host system transmits the timing signal, together with the digital video data of the input image, to the timing controller 130. The host system may execute an application associated with touch input coordinates Txy received from the touch sensor driver 150.

As illustrated in FIG. 3, the touch sensor driver 150 includes a multiplexer (MUX) 121, a sensing unit 122, and an algorithm executing unit 123. The MUX 121 sequentially selects the sensor lines 10 connected to the sensing unit 122 under the control of the algorithm executing unit 123. The MUX 121 may sequentially reduce the number of channels of the sensing unit 122 by sequentially connecting the sensor lines 10 to the sensing unit 122 in response to a MUX control signal from the algorithm executing unit 123 during a touch sensing period. The MUX 121 supplies the common voltage Vcom to the sensor lines 10 during a display period. The MUX 121 supplies a touch sensor driving signal to the sensor lines 10 during a touch sensing period.

The sensing unit 122 supplies a touch sensor driving signal Vtouch to the touch sensor electrodes 20 through the MUX 121 and the sensor lines 10 to charge the touch sensors, amplifies and integrates a charge amount of the touch sensors received through the sensor line 10 connected to the touch sensor via the touch sensor 121, converts the same into digital to sense a change in capacitance before and after the touch input. To this end, the sensing unit 122 includes a charge transmitter (or charge transfer) for supplying a touch sensor driving signal to the sensor line 10, an amplifier for amplifying a voltage on the sensor line 10, an integrator for accumulating an output voltage of the amplifier, and an analog-to-digital converter (ADC) for converting a voltage of the integrator into digital data. The digital data output from the ADC is transmitted to the algorithm executing section 123, as touch raw data (hereinafter, referred to as "touch data") indicating a change in capacitance of the touch sensor before and after the touch input.

The algorithm executing unit 123 compares the touch data received from the sensing unit 122 with a preset threshold value to detect touch data higher than the threshold value, generates touch input coordinates Txy of each touch input to the host system. The algorithm executing unit 123 may be implemented as a micro-controller unit (MCU).

FIGS. 4 and 5 are waveform views illustrating a method of driving pixels and touch sensors of the display panel 100.

Referring to FIGS. 4 and 5, one frame period may be time-divided into display periods D1 and D2 and touch sensing periods T1 and T2. When a display frame rate is 60 Hz, one frame period is approximately 16.7 ms. Each of touch sensing periods T1 and T2 is allocated between the display periods D1 and D2.

The data driver 110 and the gate driver 120 write current frame data into the pixels of the first block B1 during the first display period D1 to update an image reproduced in the first block B1 with the current frame data. During the first display period D1, pixels of the other blocks except for the first block B1 hold previous frame data. The touch sensor driver 150 supplies the common voltage Vcom to the touch sensors during the first display period D1.

The touch sensor driver 150 sequentially drives all the touch sensors in the screen during the first touch sensing period T1 to sense the touch input. The touch sensor driver 150 analyzes the touch data obtained from the touch sensors during the first touch sensing period T1 to generate touch report data including the touch input coordinates Txy and identification information of each touch input, and transmits the generated touch report data to the host system.

The data driver 110 and the gate driver 120 write the current frame data to the pixels of the second block B2 during the second display period D2 and update an image reproduced in the second block B2 with the current frame data. During the second display period D2, the pixels of the other blocks except for the second block B2 hold previous frame data. The touch sensor driver 150 supplies the common voltage Vcom, which is a common voltage of the pixels, to the touch sensors during the second display period D2.

The touch sensor driver 150 sequentially drives all the touch sensors in the screen during the second touch sensing period T2 to sense a touch input. The touch sensor driver 150 analyzes touch data obtained from the touch sensors during the second touch sensing period T2 to generate touch report data including coordinate information and identification information of each touch input, and transmits the generated touch report data to the host system.

During the touch sensing period, a load-free driving signal LFD is applied to the sensor lines 10, the data lines 102, and the gate lines 104 which are not connected to the sensing unit. The load-free driving signal LFD may be generated with same phase as a phase of the touch sensor driving signal Vtouch and a voltage ΔVtouch of the load-free driving signal LFD may be set to the same voltage as the voltage of the touch sensor driving signal. Therefore, the touch sensor driving signal Vtouch and the load-free driving signal LFD are in phase with each other and a difference in swing voltage is equal to each other.

In FIG. 5, ΔVtouch=ΔVd=ΔVg. ΔVd is a voltage of the load-free driving signal LFD applied to the data lines 102, and ΔVg is a voltage of the load-free driving signal LFD applied to the gate lines 104. In each of parasitic capacitance between the data line 102 and the touch sensor, parasitic capacitance between the gate line 104 and the touch sensor, and parasitic capacitance between the sensor lines 10 during the touch sensing periods T1 and T2, there is no voltage difference across the parasitic capacitance, and thus, the parasitic capacitance affecting the sensor lines 10 during the touch sensing periods T1 and T2 may be minimized. When the parasitic capacitance of the sensor lines 10 is minimized, sensitivity of touch sensing may be improved because noise applied to the sensor line 10 through parasitic capacitance is reduced.

FIG. 6 is a detailed circuit diagram of the level shifter 118 according to the embodiment of the present disclosure. FIG. 7 is a waveform view illustrating input/output signals of the level shifter illustrated in FIG. 6.

Referring to FIGS. 6 and 7, the level shifter 118 includes a plurality of transistors M1 to M8. The first, third, and sixth transistors M1 and M3 to M6 may be implemented as n-channel transistors and the second, seventh and eighth transistors M2, M7, and M8 may be implemented as p-channel transistors.

The level shifter 118 receives a synchronization signal Tsync and an input shift clock TGCLK from the timing controller 130. The synchronization signal Tsync defines the display periods D1 and D2 and the touch sensing periods T1 and T2. The input shift clock TGCLK defines a gate pulse period during the display period D1 and defines a pulse period of the load-free driving signal during the touch sensing periods T1 and T2.

The level shifter 118 receives the gate high voltage VGH, the first gate low voltage VGL, and the second gate low voltage VGL_H from the power supply unit 140. VGH is higher than VGL and VGL_H. VGL_H is higher than VGL. A stabilizing capacitor CVGL is connected to a VGL line of the level shifter 118.

A gate pulse swinging between VGH and VGL is applied to the gate lines 104 during the display periods D1 and D2. The load-free driving signal LFD swinging between VGL_H and VGL is applied to the gate lines 104 during the touch sensing periods T1 and T2. A voltage difference between VGL_H and VGL is equal to ΔVtouch in FIG. 5.

The first transistor M1 is a push up transistor which is turned on when the input shift clock TGCLK is a high logic voltage H during the display periods D1 and D2 to charge a voltage of an output node with VGH. The first transistor M1 is turned off when the input shift clock TGCLK is a low logic voltage L during the display periods D1 and D2 so as to be separated from the output node. The first transistor M1 is turned off and separated from the output node during the touch sensing periods T1 and T2. The first transistor M1 includes a gate connected to the first electrode of the fourth transistor M4, a first electrode connected to the VGH node to which VGH is applied, and a second electrode coupled to the output node. The output shift clock GCLK on the output node is input to the shift register of the gate driver 120. The gate driver 120 supplies a waveform of the output shift clock GCLK input to the shift register, to the gate line 104.

The second transistor M2 is a pull-down transistor turned on when the input shift clock TGCLK is a low logic voltage L during the display periods D1 and D2 to discharge the voltage of the output node to VGL. The second transistor M2 is turned off when the input shift clock TGCLK is the high logic voltage H during the display periods D1 and D2 so as to be separated from the output node. The second transistor M2 is turned on when the input shift clock TGCLK is the low logic voltage L during the touch sensing period T1 and T2 to discharge the output node to VGL, and turned off when the input shift clock TGCLK is the high logic voltage H. The second transistor M2 includes a gate connected to a node between the sixth, seventh, and eighth transistors M6, M7, and M8, a first electrode connected to the output node, and a second electrode connected to the VGL node to which VGL is applied.

The third transistor M3 is separated from the output node regardless of voltage of the input shift clock TGCLK during the display periods D1 and D2. The third transistor M3 is turned on when the input shift clock TGCLK is the high logic voltage H during the touch sensing period T1 and T2 to charge the output node to VGL_H and is turned off when the input shift clock TGCLK is the low logic voltage L. The third transistor M3 includes a gate connected to the second electrode of the eighth transistor M8, a first electrode connected to the output node, and a second electrode connected to the VGL_H node to which VGL_H is applied.

The fourth transistor M4 is turned on when the input shift clock TGCLK is the high logic voltage H during the display periods D1 and D2 to turn on the first transistor T1. The fourth transistor M4 lowers the gate voltage of the first transistor M1 to the low logic voltage of the input shift clock TGCLK when the input shift clock TGCLK is the low logic voltage L during the display periods D1 and D2. Also, the fourth transistor M4 lowers the gate voltage of the first transistor M1 to the low logic voltage L of the synchronization signal Tsync during the touch sensing periods T1 and T2. The fourth transistor M4 includes a gate to which the synchronization signal Tsync is input and connected to the gate of the fifth transistor M5, a first electrode connected to the gate of the first transistor M1, and a second electrode connected to a node between the second electrode of the fifth transistor M5 and the first electrode of the sixth transistor M6. Due to the fourth transistor M4, the input shift clock TGCLK may be at the low logic voltage L during the display periods D1 and D2 or the first transistor T1 is turned off during the touch sensing periods T1 and T2.

The fifth transistor M5 is turned on when the input shift clock TGCLK is the high logic voltage H during the display periods D1 and D2 to turn on the fourth transistor T4. The fifth transistor M5 lowers the gate voltage of the fourth transistor M4 to the low logic voltage L of the input shift clock TGCLK when the input shift clock TGCLK is the low logic voltage L during the display periods D1 and D2. In addition, the fifth transistor M5 is turned off due to the low logic voltage L of the synchronization signal Tsync during the touch sensing periods T1 and T2. The fifth transistor M5 includes a gate to which the synchronization signal Tsync is input and connected to the gate of the fourth transistor M4, a first electrode to which the input shift clock TGCLK is input from the timing controller 130, and a second electrode connected to a node between the second electrode of the fourth transistor M4 and the first electrode of the sixth transistor M6.

The sixth transistor M6 is turned on during the display periods D1 and D2 and turned off during the touch sensing periods T and T2. The sixth transistor M6 includes a gate to which the synchronization signal Tsync is input and connected to the gates of the fourth, fifth and seventh transistors M4, M5 and M7, a first electrode connected between the second electrode of the fourth transistor M4 and the second electrode of the fifth transistor M5, and a second electrode connected to a node between the second electrode of the seventh transistor M7 and the first electrode of the eighth transistor M8.

The seventh transistor M7 is held in an OFF state during the display periods D1 and D2 and turned on during the touch sensing periods T1 and T2 to supply the voltage of the input shift clock TGCLK from the timing controller 130 to the second electrode of the sixth transistor M6 and the first electrode of the eighth transistor M8. The seventh transistor M7 includes a gate to which the synchronization signal Tsync is input, a first electrode to which the input shift clock TGCLK is input, and a second electrode connected to a node between the second electrode of the sixth transistor M6 and the first electrode of the eighth transistor M8.

The eighth transistor M8 is held in an OFF state during the display periods D1 and D2 and turned on during the touch sensing periods T1 and T2 to supply the voltage of the input shift clock TGCLK from the timing controller 130 to the gate of the third transistor M3. The eighth transistor M8 includes a gate to which the synchronization signal Tsync is input, a first electrode to which the input shift clock TGCLK is input through the seventh transistor M7, and a second electrode connected to the gate of the third transistor M3.

In the level shifter 118, the first, fourth, and fifth transistors M1, M4, and M5 are turned on when the input shift clock TGCLK is the high logic voltage H during the display periods D1 and D2. Here, the voltage of the output node is charged as VGH. In the level shifter 118, the second, fifth, and sixth transistors M2, M5 and M6 are turned on when the input shift clock TGCLK is the low logic voltage L during the display periods D1 and D2. Here, the voltage of the output node is discharged to VGL.

In the level shifter 118, the third, seventh, and eighth transistors M3, M7, M8 are turned on when the input shift clock TGCLK is the high logic voltage H during the touch sensing periods T1 and T2. Here, the voltage of the output node is charged to VGL_H. In the level shifter 118, the second, seventh, and eighth transistors M2, M7 and M8 are turned on when the input shift clock TGCLK is the low logic voltage L during the touch sensing periods T1 and T2. Here, the voltage of the output node is discharged to VGL.

The output shift clock GCLK output from the level shifter 118 is supplied to the gate line 104 through the shift register of the gate driver 120. The output shift clock GCLK output from the level shifter 118 includes a waveform such as a gate pulse generated during the display periods D1 and D2 and a waveform such as the load-free driving signal LFD generated during the touch sensing periods T1 and T2 as illustrated in FIG. 4. Thus, the output shift clock GCLK output from the level shifter 118 includes a gate pulse that swings between VGH and VGL and includes a load-free driving signal LFD that swings between VGL_H and VGL.

Figure 8:
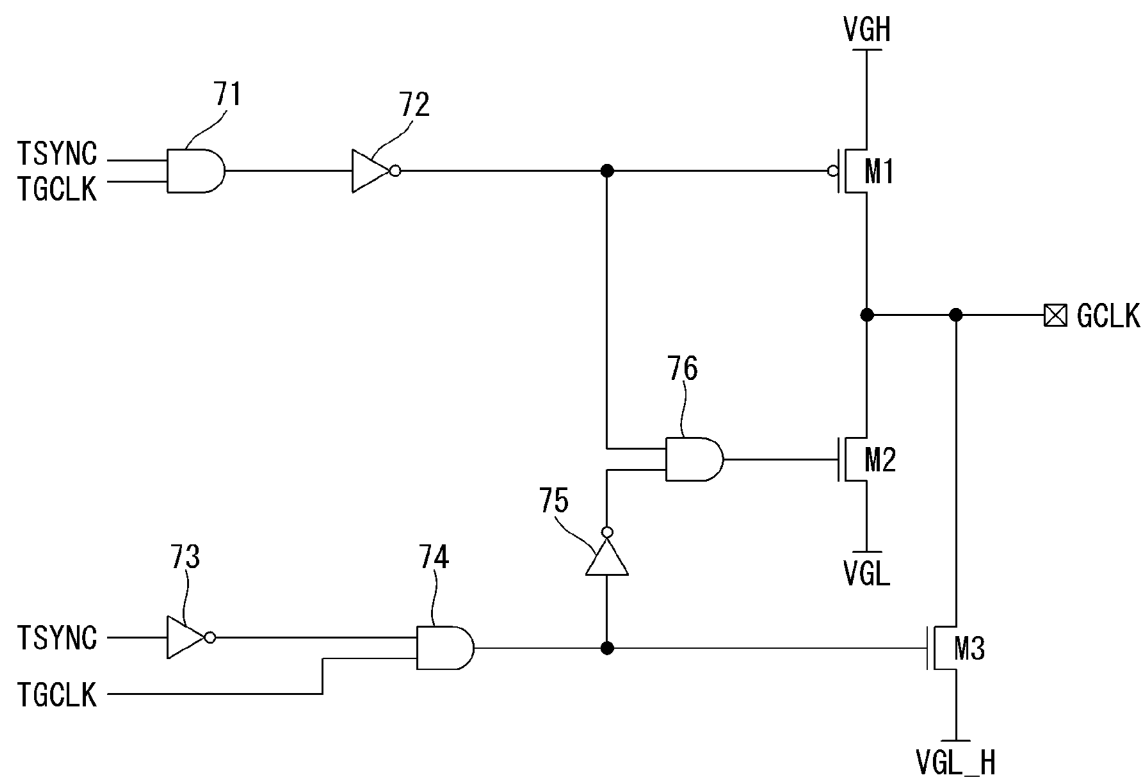
FIG. 8 is a specific circuit diagram of a level shifter according to a second embodiment of the present disclosure.

FIG. 8 is a circuit diagram illustrating another embodiment of the level shifter illustrated in FIG. 6.

Referring to FIG. 8, the level shifter 118 includes first to third transistors M1 to M3 and a logic circuit for controlling the transistors M1 to M3 according to the input signals TSYNC and TGCLK. The first transistor M1 may be implemented as a p-channel transistor. The second and third transistors M2 and M3 may be implemented as n-channel transistors.

The logic circuit includes a plurality of AND gates 71, 74 and 76 and inverters 72, 73, and 75. The logic circuit includes a first logic circuit for controlling the first transistor M1, a second logic circuit for controlling the second transistor M2, and a third logic circuit for controlling the third transistor M3.

The first transistor M1 is turned on during the gate pulse period of the display periods D1 and D2 in response to the output signal from the first logic circuit to charge the voltage of the output node of the level shifter 118 to VGH. The second transistor M2 is turned on during the VGL period of the display periods D1 and D2 excluding the gate pulse period and the VGL period of the touch sensing periods T1 and T2 excluding a pulse period of the load-free driving signal (LFD) in response to an output signal from the second logic circuit, to discharge a voltage of the output node to VGL. The third transistor M3 is turned on during the pulse period of the load-free driving signal LFD within the touch sensing periods T1 and T2 in response to an output signal from the third logic circuit, to charge the output node to VGL_H.

A gate pulse swinging between VGH and VGL is applied to the gate lines 104 during the display periods D1 and D2. A load-free driving signal LFD swinging between VGL_H and VGL is applied to the gate lines 104 during the touch sensing periods T1 and T2. A voltage difference between VGL_H and VGL is equal to ΔVtouch in FIG. 5.

The first logic circuit includes a first AND gate 71 and a first inverter 72. The first AND gate 71 and the first inverter 72 control the first transistor M1 by generating an inverted AND signal of the synchronization signal Tsync and the input shift clock TGCLK. The first AND gate 71 outputs a result of ANDing of the synchronization signal Tsync and the input shift clock TGCLK. The synchronization signal Tsync is generated with a high logic voltage H during the display periods D1 and D2 and the input shift clock TGCLK repeatedly swings between the high logic voltage H and the low logic voltage L during the display periods D1 and D2 and the touch sensing periods T1 and T2. The first AND gate 71 outputs a clock signal in phase with the input shift clock TGCLK during the display periods D1 and D2 and maintains the low logic voltage L during the touch sensing periods T1 and T2. The first inverter 72 inverts the output signal from the first AND gate 71 and applies the same to the gate of the first transistor M1. The output signal from the first inverter 72 is generated as a clock signal out of phase of the input shift clock TGCLK during the display periods D1 and D2 and maintains the high logic voltage H during the touch sensing periods T1 and T2. Accordingly, the first AND gate 71 and the first inverter 72 define the VGH period of the output shift clock GCLK during the display periods D1 and D2.

Since the first transistor M1 is a p-channel transistor, the first transistor M1 is turned on when the source-gate voltage Vsg is higher than the threshold voltage. Thus, the first transistor M1 is turned on when an output signal from the first inverter 72 is the low logic voltage L, to charge the output node to VGH. The first transistor M1 includes a gate connected to the output terminal of the first inverter 72, a first electrode connected to the VGH node, and a second electrode connected to the output node. The output shift clock GCLK on the output node is input to the shift register of the gate driver 120. The gate driver 120 supplies a waveform of the output shift clock GCLK input to the shift register, to the gate line.

The third logic circuit includes a second inverter 73 and a second AND gate 74. The second inverter 74 inverts the synchronization signal TSYNC. The second AND gate 74 outputs a result of ANDing an output signal from the second inverter 89 and the input shift clock TGCLK. Thus, the second inverter 73 and the second AND gate 74 define the VGL_H period of the output shift clock GCLK during the touch sensing periods T1 and T2.

Since the third transistor M3 is an n-channel transistor, the third transistor M3 is turned on when the gate-source voltage Vgs is higher than the threshold voltage. Accordingly, the third transistor M3 is turned on at every VGL_H period of the touch sensing periods T1 and T2 in response to the output signal from the third logic circuit during the touch sensing periods T1 and T2, thereby charging the output node to VGL_H. The third transistor M3 includes a gate connected to the output terminal of the second AND gate 74, a first electrode connected to the output node, and a second electrode connected to the VGL_H node to which VGL_H is applied.

The second logic circuit includes a third inverter 75 and a third AND gate 76. The second logic circuit receives an output signal from the first logic circuit and an output signal from the second logic circuit. The third inverter 75 inverts the output signal from the second AND gate 74. The third AND gate 76 applies a result of ANDing of the output signal from the first inverter 72 and the output signal from the third inverter 75 to the gate of the second transistor M2 to control the second transistor M2.

Since the second transistor M2 is an n-channel transistor, the second transistor M2 is turned on when the gate-source voltage Vgs is higher than the threshold voltage. Thus, the second transistor M2 is turned on when the output signal from the third AND gate 76 is a high logic voltage H, to discharge the output node to VGL. The second transistor M2 includes a gate connected to the output terminal of the third AND gate 76, a first electrode connected to the output node, and a second electrode connected to the VGL node.

Figure 9:
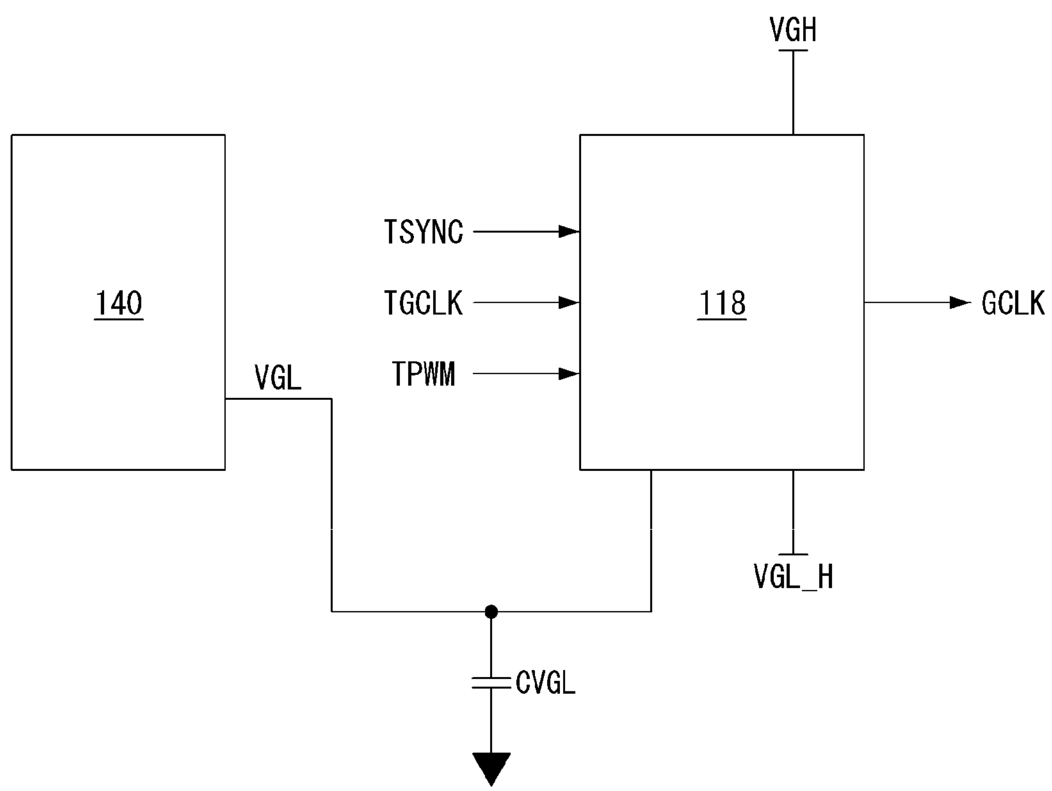
FIGS. 9 and 10 are circuit diagrams illustrating a level shifter according to a third embodiment of the present disclosure.
Figure 10:
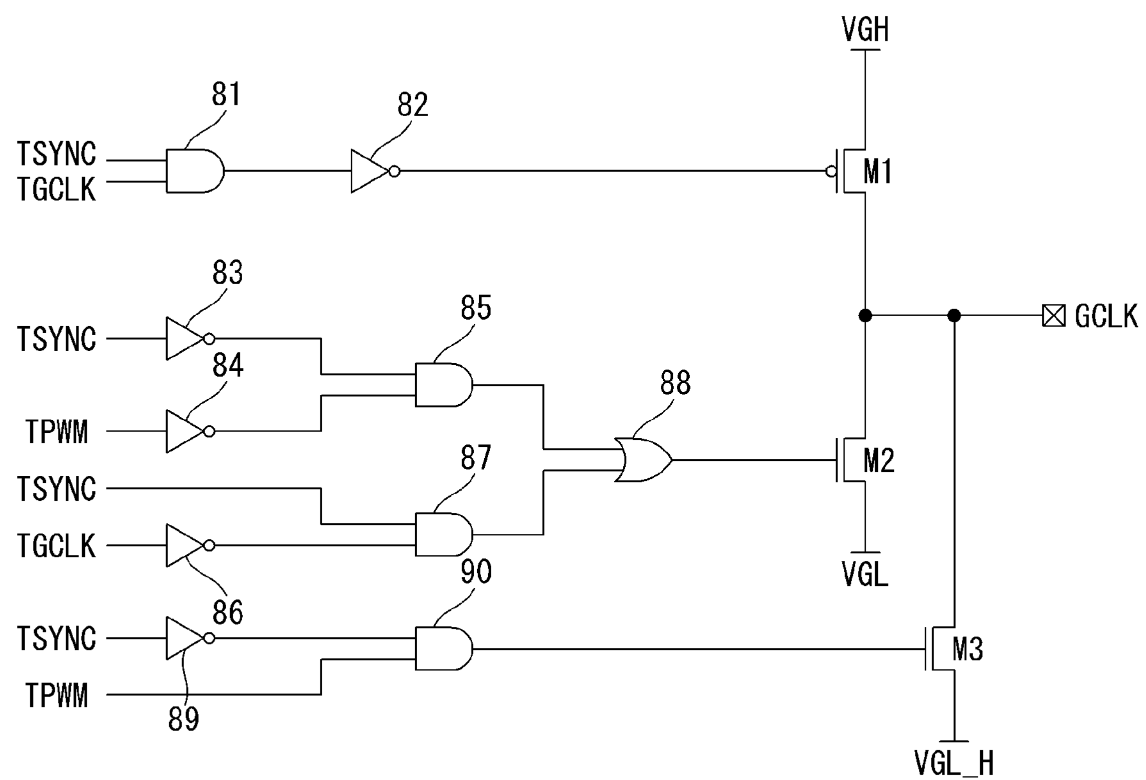
Figure 11:
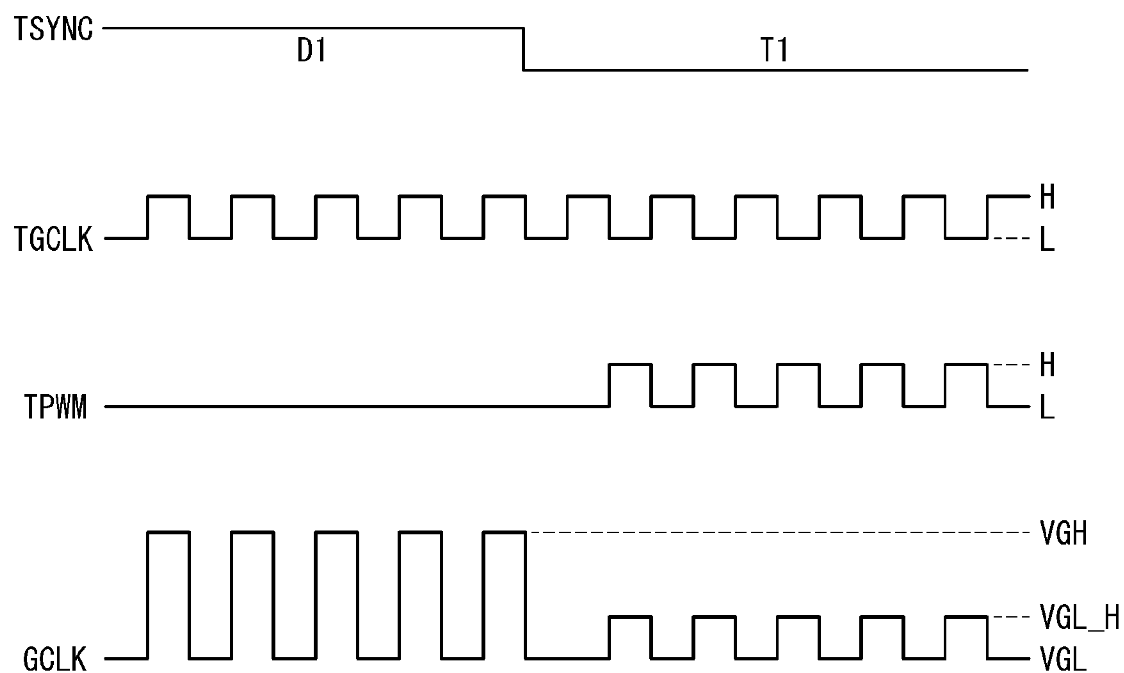
FIG. 11 is a waveform view illustrating an input/output signal of the level shifter illustrated in FIG. 10.

FIGS. 9 and 10 are circuit diagrams specifically illustrating a level shifter according to a third embodiment of the present disclosure. FIG. 11 is a waveform view illustrating input/output signals of the level shifter illustrated in FIG. 10.

Referring to FIGS. 9 to 11, a level shifter 118 receives VGH, VGL, and VGL_H from the power supply unit 140. The level shifter 118 receives the synchronization signal Tsync, the input shift clock TGCLK, and a PWM signal TPWM from the timing controller 130. The synchronization signal Tsync defines the display periods D1 and D2 and the touch sensing periods T1 and T2. The input shift clock TGCLK defines a gate pulse period during the display period D1 and defines a pulse period of a load-free driving signal during the touch sensing periods T1 and T2. The PWM signal TPWM is maintained at the low logic voltage L during the display periods D1 and D2 and is generated as an AC signal swinging between the high logic voltage H and the low logic voltage L during the touch sensing periods T1 and T2. Accordingly, the PWM signal TPWM defines a pulse period of the load-free driving signal LFD during the touch sensing periods T1 and T2. The phase of the PWM signal TPWM generated as the AC signal during the touch sensing period TPWM is the same as that of the load-free driving signal LFD.

The level shifter 118 includes first to third transistors M1 to M3 and a logic circuit for controlling the transistors M1 to M3 according to the input signals TSYNC, TGCLK, and TPWM. The first transistor M1 may be implemented as a p-channel transistor. The second and third transistors M2 and M3 may be implemented as n-channel transistors.

The logic circuit includes a plurality of AND gates 81, 85, 87, and 90, an OR gate 88, and inverters 82, 83, 84, 86, and 89. The logic circuit includes a first logic circuit for controlling the first transistor M1, a second logic circuit for controlling the second transistor M2, and a third logic circuit for controlling the third transistor M3.

The first transistor M1 is turned on during the gate pulse period of the display periods D1 and D2 in response to the output signal from the first logic circuit, to charge the voltage of the output node of the level shifter 118 to VGH. The second transistor M2 is turned on during the VGL period of the display periods D1 and D2 excluding the gate pulse period and the VGL period of the touch sensing periods T1 and T2 excluding the pulse period of the load-free driving signal LFD in response to the output signal from the second logic circuit, to discharge the voltage of the output node to VGL. The third transistor M3 is turned on during the pulse period of the load-free driving signal LFD within the touch sensing periods T1 and T2 in response to the output signal from the third logic circuit, to charge the output node to VGL_H.

A gate pulse swinging between VGH and VGL are applied to the gate lines 104 during the display periods D1 and D2. The load-free driving signal LFD swinging between VGL_H and VGL is applied to the gate lines 104 during the touch sensing periods T1 and T2. A voltage difference between VGL_H and VGL is equal to ΔVtouch in FIG. 5.

The first logic circuit includes a first AND gate 81 and a first inverter 82. The first AND gate 81 and the first inverter 82 control the first transistor M1 by generating an inverted AND signal of the synchronization signal Tsync and the input shift clock TGCLK. The first AND gate 81 outputs a result of ANDing of the synchronization signal Tsync and the input shift clock TGCLK. The synchronization signal Tsync is generated with a high logic voltage H during the display periods D1 and D2 and the input shift clock TGCLK repeatedly swings between the high logic voltage H and the low logic voltage L during the display periods D1 and D2 and the touch sensing periods T1 and T2. The first AND gate 81 outputs a clock signal in phase with the input shift clock TGCLK during the display periods D1 and D2 and maintains the low logic voltage L during the touch sensing periods T1 and T2. The first inverter 82 inverts the output signal from the first AND gate 81 and applies the same to the gate of the first transistor M1. The output signal from the first inverter 82 is generated as a clock signal out of phase of the input shift clock TGCLK during the display periods D1 and D2 and maintains the high logic voltage H during the touch sensing periods T1 and T2. Accordingly, the first AND gate 81 and the first inverter 82 define the VGH period of the output shift clock GCLK during the display periods D1 and D2.

Since the first transistor M1 is a p-channel transistor, the first transistor M1 is turned on when the source-gate voltage Vsg is higher than the threshold voltage. Thus, the first transistor M1 is turned on when an output signal from the first inverter 82 is the low logic voltage L, to charge the output node to VGH. The first transistor M1 includes a gate connected to the output terminal of the first inverter 82, a first electrode connected to the VGH node, and a second electrode connected to the output node. The output shift clock GCLK on the output node is input to the shift register of the gate driver 120. The gate driver 120 supplies a waveform of the output shift clock GCLK input to the shift register, to the gate line.

The second logic circuit includes second to fourth inverters 83, 84, and 86, second and third AND gates 85 and 87, and an OR gate 88. The second logic circuit controls the second transistor M2 using the synchronization signal Tsync, the PWM signal TPWM, and the input shift clock TGCLK.

The second inverter 83 and the third inverter 84 invert the synchronization signal TSYNC and the PWM signal TPOWM and input the same to the second AND gate 85. The second AND gate 85 ANDs output signals from the second and third inverters 83 and 84 and outputs a logic high voltage H when both the synchronization signal TSYNC and the PWM signal TPWM are at low logic voltage L. Therefore, the second and third inverters 83 and 84 and the second AND gate 85 define the VGL period of the output shift clock GCLK during the touch sensing periods T1 and T2.

The fourth inverter 86 inverts the input shift clock TGCLK. The third AND gate 87 outputs the synchronous signal TSYNC and the result of ANDing of the fourth inverter 86. Therefore, the fourth inverter 86 and the third AND gate 87 define the VGL period of the output shift clock GCLK during the display periods D1 and D2.

The OR gate 88 outputs the result of ORing the output signal from the second AND gate 85 and the output signal from the third AND gate 87. The OR gate 88 defines a VGL period of the output shift clock GCLK during the display periods D1 and D2 and the touch sensing periods T1 and T2.

Since the second transistor M2 is an n-channel transistor, the second transistor M2 is turned on when the gate-source voltage Vgs is higher than the threshold voltage. Thus, the second transistor M2 is turned on when the output signal from the OR gate 88 is the high logic voltage H, to discharge the output node to VGL. The second transistor M2 includes a gate connected to an output terminal of the OR gate 88, a first electrode connected to the output node, and a second electrode connected to the VGL node.

The third logic circuit includes a fifth inverter 89 and a fourth AND gate 90. The fifth inverter 89 inverts the synchronization signal TSYNC. The second inverter 83 and the fifth inverter 89 may be implemented as a single inverter. The fourth AND gate 90 outputs a result of ANDing of the output signal from the fifth inverter 89 and the PWM signal TPWM. Therefore, the fifth inverter 86 and the fourth AND gate 90 define the VGL_H period of the output shift clock GCLK during the touch sensing periods T1 and T2.

Since the third transistor M3 is an n-channel transistor, the third transistor M3 is turned on when the gate-source voltage Vgs is higher than the threshold voltage. Accordingly, the third transistor M3 is turned on when the PWM signal TPWM is the high logic voltage H during the touch sensing periods T1 and T2, to charge the output node to VGL_H. The third transistor M3 includes a gate connected to an output terminal of the fourth AND gate 90, a first electrode connected to the output node, and a second electrode connected to the VGL_H node to which VGL_H is applied.

As described above, in the present disclosure, the level shifter generates an AC signal during the touch sensing period. Therefore, in the present disclosure, waveform distortion of the load-free driving signal may be prevented without removing the stabilizing capacitor of the level shifter, and thus, sensing sensitivity may be increased by reducing noise of a touch sensor signal.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:

a display panel including a plurality of data lines and a plurality of gate lines intersecting the plurality of data lines, a plurality of pixels arranged in a matrix form, and a plurality of touch sensors connected to the plurality of pixels;

a power supply unit generating a first voltage, a second voltage that is less than the first voltage, and a third voltage that is less than the first voltage and greater than the second voltage;

a control signal generating unit generating a synchronization signal defining a display period during which the display panel displays an image and a touch sensing period during which touch of the display panel is sensed, and an input clock defining a gate pulse period during the display period and defining a pulse period of an alternating current (AC) signal during the touch sensing period;

a level shifter receiving the synchronization signal, the input clock, the first voltage, the second voltage, and the third voltage and generating an output clock swinging between the first voltage and the second voltage during the display period, the output clock swinging between the second voltage and the third voltage during the touch sensing period; and a gate driver supplying a gate pulse swinging between the first voltage and the second voltage to the plurality of gate lines during the display period and supplying the AC signal swinging between the third voltage and the second voltage to the plurality of gate lines during the touch sensing period.

2. The display device of claim 1, wherein the gate driver includes a shift register that shifts the output clock received from the level shifter.

3. The display device of claim 2, wherein the second voltage is supplied to the level shifter through a low potential power supply line between the power supply unit and the level shifter, and the display device further comprising:

a stabilizing capacitor connected to the low potential power supply line.

4. The display device of claim 3, wherein the level shifter includes:

a first transistor turned on responsive to the input clock being at a first logic voltage during the display period and charge a voltage of an output node of the level shifter to the first voltage during the display period, and the first transistor turned off during the touch sensing period;

a second transistor turned on responsive to the input clock being at a second logic level that is less than the first logic level during the display period and the touch sensing period, the second transistor discharging the voltage of the output node to the second voltage; and a third transistor that is off during the display period and turned on responsive to the input clock being at the first logic voltage during the touch sensing period, the third transistor charging the output node to the third voltage.

5. The display device of claim 4, further comprising:

a fourth transistor turned on responsive to the input clock being at the first logic voltage during the display period;

a fifth transistor turned on responsive to the input clock being at the first logic voltage during the display period;

a sixth transistor turned on during the display period and turned off during the touch sensing period;

a seventh transistor turned off during the display period and turned on during the touch sensing period; and an eighth transistor turned off during the display period and turned on during the touch sensing period, the eighth transistor supplying the input clock to a gate electrode of the third transistor.

6. The display device of claim 1, wherein the level shifter includes:

a first transistor turned on during the gate pulse period of the display period in response to an output signal from a first logic circuit, the first transistor charging a voltage of an output node of the level shifter to the first voltage;

a second transistor turned on during a second voltage period of the display period excluding the gate pulse period and a second voltage period of the touch sensing period excluding the pulse period of the AC signal in response to an output signal from a second logic circuit, the second transistor discharging the voltage of the output node to the second voltage; and a third transistor turned on during the pulse period of the AC signal within the touch sensing period in response to an output signal from a third logic circuit, the third transistor charging the output node to the third voltage.

7. The display device of claim 6, wherein the first logic circuit includes:

a first AND gate outputting a result of an AND operation of the synchronization signal and the input clock; and a first inverter inverting an output signal from the first AND gate and applying the inverted output signal to a gate electrode of the first transistor.

8. The display device of claim 7, wherein the third logic circuit includes:

a second inverter inverting the synchronization signal; and a second AND gate applying a result of an AND operation of the inverted synchronization signal and the input clock to a gate of the third transistor.

9. The display device of claim 8, wherein the second logic circuit includes:

a third inverter inverting the output signal from the second AND gate; and a third AND gate applying an AND operation to the inverted output signal generated by the first inverter and the output signal from the third inverter to a gate electrode of the second transistor.

10. A display device comprising:

a display panel including a plurality of data lines and a plurality of gate lines intersecting the plurality of data lines, a plurality of pixels arranged in a matrix form, and a plurality of touch sensors connected to the plurality of pixels;

a power supply unit generating a first voltage, a second voltage that is less than the first voltage, and a third voltage that is less than the first voltage and greater than the second voltage;

a control signal generating unit generating a synchronization signal defining a display period during which the display panel display an image and a touch sensing period during which touch of the display panel is sensed, an input clock defining a gate pulse period during the display period and defining a pulse period of an alternating current (AC) signal during the touch sensing period, and a pulse width modulation (PWM) signal defining a pulse period of the AC signal during the touch sensing period;

a level shifter receiving the synchronization signal, the input clock, the first voltage, the second voltage, and the third voltage and generating an output clock swinging between the first voltage and the second voltage during the display period and the output clock swinging between the second voltage and the third voltage during the touch sensing period; and a gate driver supplying a gate pulse swinging between the first voltage and the second voltage to the plurality of gate lines during the display period and supplying the AC signal swinging between the third voltage and the second voltage to the plurality of gate lines during the touch sensing period.

11. The display device of claim 10, wherein the gate driver includes a shift register that shifts a signal input from the level shifter.

12. The display device of claim 11, wherein the second voltage is supplied to the level shifter through a low potential power supply line between the power supply unit and the level shifter, and the display device further comprising:

a stabilizing capacitor connected to the low potential power supply line.

13. The display device of claim 12, wherein the level shifter includes:

a first transistor turned on during the gate pulse period of the display period in response to an output signal from a first logic circuit, the first transistor charging a voltage of an output node of the level shifter to the first voltage;

a second transistor turned on during a second voltage period of the display period excluding the gate pulse period and a second voltage period of the touch sensing period excluding the pulse period of the AC signal in response to an output signal from a second logic circuit, the second transistor discharging the voltage of the output node to the second voltage; and a third transistor turned on during the pulse period of the AC signal within the touch sensing period in response to an output signal from a third logic circuit, the third transistor charging the output node to the third voltage.

14. The display device of claim 13, wherein the first logic circuit includes:

a first AND gate outputting a first output signal based on an AND operation of the synchronization signal and the input clock; and a first inverter inverting the first output signal from the first AND gate and outputting the inverted first output signal to a gate of the first transistor.

15. The display device of claim 14, wherein the second logic circuit includes:

a second inverter inverting the synchronization signal;

a third inverter inverting the PWM signal;

a second AND gate outputting a second output signal based on an AND operation the inverted synchronization signal and the inverted PWM signal;

a fourth inverter inverting the input clock;

a third AND gate outputting a third output signal based on an AND operation of the synchronization signal and the inverted input clock; and an OR gate outputting a fourth output signal based on an OR operation of the second output signal and the third output signal, the fourth output signal outputted to a gate electrode of the second transistor.

16. The display device of claim 15, wherein the third logic circuit includes:

a fifth inverter inverting the synchronization signal; and a fourth AND gate outputting a fifth output signal based on an AND operation of the inverted synchronization signal and the PWM signal, the fifth output signal output to a gate electrode of the third transistor.

17. A display device comprising:

a display panel including a plurality of data lines and a plurality of gate lines intersecting the plurality of data lines, a plurality of pixels arranged in a matrix form, and a plurality of touch sensors connected to the a plurality of pixels;

a data driver supplying a data voltage of an input image to the a plurality of data lines during a display period during which the display panel displays the input image;

a touch sensor driver supplying a common voltage to the plurality of pixels through the plurality of touch sensors during the display period and supplying a touch sensor driving signal to the plurality of touch sensors during a touch sensing period during which touch of the display panel is sensed;

a gate driver supplying a gate pulse synchronized with the data voltage to the plurality of gate lines during the display period using a shift register and supplying a load-free driving signal having a same phase as the touch sensor driving signal to the plurality of gate lines during the touch sensing period;

a timing controller generating a synchronization signal defining the display period and the touch sensing period and an input clock defining a gate pulse period during the display period and defining a pulse period of the load-free driving signal within the touch sensing period;

a power supply unit generating a first voltage, a second voltage that is less than the first voltage, and a third voltage that is less than the first voltage and greater than the second voltage; and a level shifter receiving the synchronization signal, the input clock, the first voltage, the second voltage, and the third voltage to output a shift clock input to a shift register of the gate driver, wherein the shift clock has a waveform that matches a waveform of the gate pulse and a waveform of the load-free driving signal, the gate pulse swings between the first voltage and the third voltage during the touch sensing period, and the load-free driving signal swings between the second voltage and the third voltage during the touch sensing period.

18. A display device comprising:

a display panel including a plurality of data lines and a plurality of gate lines intersecting the a plurality of data lines, a plurality of pixels arranged in a matrix form, and a plurality of touch sensors connected to the a plurality of pixels;

a data driver supplying a data voltage of an input image to the a plurality of data lines during a display period during which the display panel displays the input image;

a touch sensor driver supplying a common voltage to the plurality of pixels through the plurality of touch sensors during the display period and supplying a touch sensor driving signal to the plurality of touch sensors during a touch sensing period during which touch of the display panel is sensed;

a gate driver supplying a gate pulse synchronized with the data voltage to the plurality of gate lines during the display period and supplying a load-free driving signal having a same phase as the touch sensor driving signal to the plurality of gate lines during the touch sensing period;

a timing controller generating a synchronization signal defining the display period and the touch sensing period, an input clock defining a gate pulse period during the display period and defining a pulse period of the load-free driving signal within the touch sensing period, and a pulse width modulation (PWM) signal defining a pulse period of the load-free driving signal within the touch sensing period;

a power supply unit generating a first voltage, a second voltage that is less than the first voltage, and a third voltage that is less than the first voltage and greater than the second voltage; and a level shifter receiving the synchronization signal, the input clock, the PWM signal, the first voltage, the second voltage, and the third voltage to output a shift clock input to a shift register of the gate driver, wherein the shift clock includes has a waveform that matches a waveform of the gate pulse and a waveform of the load-free driving signal, the gate pulse swings between the first voltage and the third voltage during the touch sensing period, and the load-free driving signal swings between the second voltage and the third voltage during the touch sensing period.

19. A display device comprising:

a display panel including a plurality of data lines and a plurality of gate lines interesting the plurality of data lines, a plurality of pixels at the intersections of the plurality of gate lines and the plurality of data lines, and a plurality of touch sensors connected to the plurality of pixels;

a level shifter configured to generate an output clock that swings between a first voltage and a second voltage that is greater than the first voltage during a display period during which the display panel displays an image, and configured to generate the output clock that swings between the first voltage and a third voltage that is less than the second voltage and greater than the first voltage during a touch sensing period during which touch of the display panel is sensed; and a gate driver configured to supply a gate pulse to the plurality of gate lines, the gate pulse swinging between the first voltage and the second voltage during the display period, and the gate pulse swinging between the first voltage and the third voltage during the touch sensing period.

20. The display device of claim 19, further comprising:

a capacitor connected to a power supply line that supplies the first voltage.

21. The display device of claim 19, further comprising:

a control signal generating unit generating a synchronization signal defining the display period and the touch sensing period, and an input clock defining a gate pulse period during the display period and defining a pulse period of an alternating current (AC) signal during the touch sensing period.

22. The display device of claim 21, wherein the control signal generating unit is further configured to generate a pulse width modulation (PWM) signal defining a pulse period of the AC signal during the touch sensing period.

23. The display device of claim 19, further comprising:

a touch sensor driver supplying a common voltage to the plurality of pixels through the plurality of touch sensors during the display period and supplying a touch sensor driving signal to the plurality of touch sensors during the touch sensing period during which touch of the display panel is sensed.

24. The display device of claim 23, wherein the touch sensor driving signal swings between the first voltage and the third voltage during the touch sensing period, and a voltage on the plurality of data lines swings between the first voltage and the third voltage during the touch sensing period.

* * * * *